United States Patent [19]

Stolz et al.

[11] 4,303,686

[45] Dec. 1, 1981

[54] PROCESS FOR REDUCING ACID CONTENT STEAMED COFFEE

[75] Inventors: Robert P. Stolz, Dumont, N.J.; Norman P. Ouellette, Goshen; Johanna M. Linthorst, Yonkers, both of N.Y.; Thomas V. Herlihy, Rutherford, N.J.

[73] Assignee: General Foods Corporation, White Plains, N.Y.

[21] Appl. No.: 120,802

[22] Filed: Feb. 12, 1980

[51] Int. Cl.³ ................................................ A23F 5/16
[52] U.S. Cl. ................................... 426/386; 426/472; 426/478; 426/481; 426/594
[58] Field of Search ............... 426/386, 472, 478, 481, 426/594

[56] References Cited

U.S. PATENT DOCUMENTS

| | | | |
|---|---|---|---|
| 3,132,947 | 5/1964 | Mahlmann | 426/386 |
| 3,420,674 | 1/1969 | McCartney | 426/386 X |
| 3,615,665 | 10/1971 | White et al. | 426/386 X |
| 4,092,436 | 5/1978 | MacDonald et al. | 426/386 X |

*Primary Examiner*—Joseph M. Golian
*Attorney, Agent, or Firm*—Thomas R. Savoie; Daniel J. Donovan

[57] ABSTRACT

Soluble coffee is produced by steaming an elongated bed of roasted and ground coffee at atmospheric pressure or above and collecting an aromatic flavor condensate. Thereafter the steamed bed is swept for at least 15 minutes with a gaseous stream having a superficial velocity through the bed in excess of 3 meters/min. in order to entrain and remove liquid acid components. The coffee is next subjected to aqueous extraction, the extract is then combined with at least a portion of the condensate and dried. The resulting soluble coffee is much reduced in undesirable acid content compared to soluble coffee obtained from steamed coffee which had not been swept with gas.

4 Claims, No Drawings

PROCESS FOR REDUCING ACID CONTENT STEAMED COFFEE

TECHNICAL FIELD

The present invention is related to the production of an enhanced soluble coffee product which is prepared by the known technique of steaming volatiles from a bed of roasted and ground coffee and obtaining a flavorful condensate fraction from the steamed volatiles. This condensate is then added to an aqueous extract obtained from the steamed coffee and the flavorful extract is then dried.

It has long been recognized in the coffee art that one of the undesirable side effects of a prolonged steam treatment of a bed of roasted and ground coffee is the development of acids which find their way into the coffee extract when the steamed coffee is subsequently subjected to aqueous extraction. Several techniques have been suggested in the past for ameliorating this problem including the use of chemicals to neutralize the acids. In U.S. Pat. No. 3,420,674, the technique of subjecting the steamed coffee to a vacuum operation in order to vaporize the acids and remove them in vapor form is disclosed.

The present invention has application to the reduction of acid resulting from any process in which an elongated bed (i.e., a bed having a length five times its width) of roasted and ground coffee is subjected to a steaming operation at atmospheric or superatmospheric for a time in excess of ten minutes.

Several of these steaming techniques, as well as methods for condensing the steamed volatiles and adding the condensed volatiles to aqueous coffee extracts, are disclosed in U.S. Pat. No. 3,132,947 to Mahlmann, U.S. Pat. No. 3,148,070 to Mishkin et al., U.S. Pat. No. 3,244,531 to Clinton et al. and U.S. Pat. No. 3,532,507 to Cascione. Each of these patents is hereby incorporated by reference.

DISCLOSURE OF THE INVENTION

According to the present invention, an elongated bed of roasted and ground coffee which has been subjected to a flow of steam for a period in excess of ten minutes is swept with a stream of a gas that will not chemically interact with coffee volatiles and which is noncondensible at ice water conditions (above about 4° C.), such as air or nitrogen. This gaseous stream must be passed through the bed, in the same direction as steam flow, with a sufficiently high velocity to entrain the liquid acids which have been generated in the column during the steaming operation. The superficial velocity of the gas stream must be in excess of 3 meters/min. (about 10 ft./min.). As used herein, the term superficial velocity can be defined as the flow rate of gas (expressed in cubic meters per minute) divided by the cross-sectional area of the coffee bed (expressed in square meters). The gaseous stream is passed through the steamed column for a sufficient period of time to remove undesired acids, with higher gas velocities requiring less time than lower velocities. It is contemplated that the steamed column will be swept with the stream of gas for a period of at least five minutes and typically for at least fifteen minutes.

The use of a high velocity gas stream for desouring steamed coffee is seen to sweep acid-laden liquor from the coffee in the form of a mist, while the liquor remains in a liquid state. Use of a vacuum on the steamed column in order to draw off volatile acids requires that the acid-laden liquor be evaporated. As the concentration of volatile acids in the liquor is not large and evaporation of the acids occurs as a function of their partial pressures, removal of acids by evaporation is limited by the amount of vacuum that can economically be applied to the system.

The volatiles which are removed from the coffee bed during the steaming operation are collected by condensation in a conventional manner. Typically condensation is effected at temperatures in the range of 0° to 20° C. in an ice-water cooled condenser; however, lower temperatures and/or multiple stage condensation may be employed. The components which are removed from the coffee bed during the sweeping operation are not intended to be added-back to the soluble coffee process; therefore, there is no necessity to separate or otherwise collect these components.

Subsequent to the sweeping operation the coffee is extracted in a conventional manner with an aqueous fluid. This extract is combined with at least a portion of the condensed volatiles recovered from the steaming operation and the volatile-containing extract is then dried. Preferably drying should be effected in a manner which minimize loss of volatiles. Such known techniques as freeze drying and spray drying have proven effective.

The soluble coffee produced via the method of this invention can be reconstituted to a coffee beverage having a relatively high level of flavorful volatiles, as measured both in organoleptically and by gas chromatographic analysis, and an absence of any preceived increase in sour notes.

BEST MODE OF CARRYING OUT THE INVENTION

The effectiveness of the gas sweeping process of this invention has been shown by first steaming an elongated column of relatively dark roasted and percolator-grind sized colombian coffee which has a moisture content of about 7% by weight. The column was steamed in an upflow manner for about seventeen minutes at a steam pressure of from 210 to 250 gms/cm$^2$ (3–3.5 lbs/in) and condensate (collected at 10° C.) was obtained at the rate of 6.08 cc for each kilogram of coffee contained in the column. This steaming operation was performed in a like manner on five identical columns of coffee after which four of these columns were swept with an upflowing nitrogen stream at velocities of 6.55 and 13.1 m/min for times of 15 minutes and 30 minutes each. At the end of the sweeping period each of the five steamed columns and an unsteamed control column was extracted with 93.3° C. water, employing water equal to one-half of the weight of any R&G coffee present in the column, over a twenty minute cycle time. Expert flavor panel evaluation found that the four nitrogen swept columns yielded an extract which, after being freeze-dried and reconstituted, was decreased in sourness from the steamed control. The titratable acidity (TA) of the respective extracts was found to be as given below. Titratable acidity is the measurable amount of total acid present in the extract and is expressed in Tables I and II in millequivalents per gram of R&G coffee from which the extract is obtained in order to eliminate the effect of any extraction yield differences that might occur.

TABLE I

| Column | TA |
| --- | --- |
| 6.55 m/min for 15 min | .046 |
| 6.55 m/min for 30 min | .054 |
| 13.1 m/min for 15 min | .048 |
| 13.1 m/min for 30 min | .051 |
| Unsteamed Controlled | .057 |
| Steamed Control | .073 |

As can be seen from Table I, the steamed control beverage contains the most acid, and on flavor evaluation this extract was rated as the most sour.

EXAMPLE I

Identical columns of roasted and ground coffee (100% Colombian) were steamed in the same manner in accordance with Mahlmann U.S. Pat. No. 3,132,947 (18 minutes at about 3 psig. (210 gms/cm$^2$) and an equivalent condensed, steam-distilled volatile fraction was obtained from each column. According to a first procedure, the R&G coffee present in one of the columns was removed and unsteamed, fresh R&G coffee was substituted and thereafter extracted. In a second procedure, the column of steamed R&G was swept with a stream of air having a superficial velocity of 13.1 meters per minute for a period of 30 minutes and immediately extracted. In a third procedure, the steamed column was extracted immediately after the steaming cycle was completed. Each of the extraction operations was performed in the same pilot-plant sized, multi-stage, countercurrent percolation system with each of the fresh columns being treated in accordance with one of the three aforementioned procedures. The percolation system was run for a sufficient number of cycles to obtain an equilibrium condition before extract was taken for evaluation. Extracts from each of the three extraction operations were combined with a standardized level of the condensed, steam-distilled volatiles and then dried to a powder having a moisture content of between 1% and 3% by weight. Coffee beverages were prepared from the three samples and analyzed for titratable acidity and evaluated by a panel of skilled coffee tasters for flavor.

TABLE II

| Sample | TA | Flavor Comments |
| --- | --- | --- |
| Volatiles & Extract obtained from separate batches of R&G | 0.17 | More preferred - green; low woody |
| Volatiles & extract from same R&G (no sweeping) | 0.19 | Less preferred - moderately sour; most winey, slightly thin |
| Volatiles & extract from same R&G (with sweeping) | 0.16 | More preferred - woody; lacks buttery, slightly thin |

The first and third samples were rated about equal in quality and superior to the second sample which was prepared from the unswept R&G.

We claim:

1. A process for reducing the acid content of soluble coffee solids obtained from an elongated bed of roasted coffee which has been subjected to a flow of atmospheric or superatmospheric steam for a period of time in excess of ten minutes in order to remove volatile aromas which process comprises stopping the flow of steam, thereafter passing a stream of of air or nitrogen through the steamed bed, in the same direction as steam flow, for at least five minutes, and at a superficial velocity in excess of 3 meters per minute and sufficient to entrain the liquid acids present in the bed, thereafter discarding the entrained liquid acids and extracting the steamed and swept coffee to form an aqueous extract and drying the resulting extract.

2. The process of claim 1 wherein volatile aromas removed from the coffee bed during steaming are added to the aqueous extract prior to drying.

3. The process of claim 2 wherein the stream of gas is passed through the bed at a superficial velocity of at least 6.55 meters/minute.

4. The process of claims 1 or 3 wherein the stream of gas is passed through the steamed bed for at least 15 minutes.

* * * * *